United States Patent
Bussi et al.

(10) Patent No.: US 6,239,196 B1
(45) Date of Patent: May 29, 2001

(54) POLYMER FILLED WITH SOLID PARTICLES

(75) Inventors: Philippe Bussi, Bernay; Jérôme Thierry-Mieg, le Tholonet, both of (FR)

(73) Assignee: Appryl S.N.C. (FR)

( * ) Notice: Subject to any disclaimer, the term of this patent is extended or adjusted under 35 U.S.C. 154(b) by 0 days.

(21) Appl. No.: 09/074,053

(22) Filed: May 7, 1998

(30) Foreign Application Priority Data

May 7, 1997 (FR) .................................................. 97 05630

(51) Int. Cl.$^7$ ............................... C08K 3/20; C08L 23/16
(52) U.S. Cl. .............................................. 523/313; 523/333
(58) Field of Search ..................................... 523/333, 313

(56) References Cited

U.S. PATENT DOCUMENTS

| | | |
|---|---|---|
| 4,806,421 | 2/1989 | Matsushita et al. . |
| 4,913,774 | 4/1990 | Goguelin . |
| 5,667,580 | 9/1997 | Bäbler . |

FOREIGN PATENT DOCUMENTS

| | | |
|---|---|---|
| 9513195 | 7/1995 | (AU) . |
| 2 455 166 | 6/1975 | (DE) . |
| 0 669 372 | 8/1995 | (EP) . |
| 669 365 | 8/1995 | (EP) . |
| 0 754 562 | 1/1997 | (EP) . |
| 1013104 | 12/1965 | (GB) . |
| 1049773 | 11/1966 | (GB) . |
| 1447304 | 8/1976 | (GB) . |
| 1537240 | 12/1978 | (GB) . |
| 1554149 | 10/1979 | (GB) . |
| 47-039238 | 4/1971 | (JP) . |
| 56-004642 | 1/1981 | (JP) . |
| 56-113429 | 9/1981 | (JP) . |
| 59-105032 | 6/1984 | (JP) . |
| 63-264930 | 11/1988 | (JP) . |
| 01266216 | 10/1989 | (JP) . |
| 05042641 | 8/1991 | (JP) . |
| WO 95/17998 | 7/1995 | (WO) . |
| WO 97/30199 | 8/1997 | (WO) . |

*Primary Examiner*—Patrick D. Niland
(74) *Attorney, Agent, or Firm*—Pennie & Edmonds LLP

(57) ABSTRACT

The invention relates to a process for the preparation of a composition to be extruded comprising a polymer and a filler of solid particles comprising a stage of mixing the filler of solid particles with particles or granules of the said polymer, if appropriate in the form of an aqueous suspension.

The invention is particularly simple, and the final material is in better mechanical properties than those obtained by direct incorporation of the solid filler in the polymer or copolymer. This improvement is very substantial, in particular with regard to the impact strength of the final material. The invention also relates to a polypropylene-based composition comprising a filler of solid particles, such as kaolin, exhibiting a high flexural modulus and a good impact strength.

16 Claims, No Drawings

POLYMER FILLED WITH SOLID PARTICLES

TABLE OF CONTENTS
1. BACKGROUND OF THE INVENTION
   1.1. Technical Field
   1.2. Description of Related Art
2. SUMMARY OF THE INVENTION
3. DESCRIPTION OF THE PREFERRED EMBODIMENTS
   3.1. Examples 1 to 5
   3.2. Examples 6 to 8
   3.3. Examples 9 and 10
   3.4. Examples 11 and 12
   3.5. Examples 13 to 16
4. CLAIMS
5. ABSTRACT OF THE DISCLOSURE
6. DECLARATION AND POWER OF ATTORNEY

1. BACKGROUND OF THE INVENTION

1.1. Technical Field

The invention relates to a process for the preparation of a material comprising a filler of solid particles dispersed in a polymer by extrusion of a composition prepared by mixing the said filler with particles or granules of the said polymer, the material itself, and useful shaped articles such as motor vehicle fascia or dashboards which can be fabricated from the said material. The subjects matter of the invention appear in the claims.

1.2. Description of Related Art

The incorporation of a solid filler in a polymer makes it possible to improve some of properties of said polymer, such as to increase its stiffness and its deformation temperature under load and to modify its appearance, such as its coloration. Furthermore, in the case of a semi-crystalline thermoplastic polymer, the presence of a solid filler within it makes it possible to reduce the shrinkage during its cooling, for example after it has been processed while hot, for example by extrusion, injection or blow moulding.

However, this incorporation of the filler is also generally reflected by a harmful influence on some properties of the polymer, such as a decrease in its impact strength and a reduction in its elongation at break.

This influence of the solid filler on the stiffness, the deformation temperature under load, the impact strength and the elongation at break increases as the level of solid filler increases and as the aspect ratio of the filler increases. Aspect ratio is understood to mean the mean ratio of the greater particle dimension to the smaller particle dimension.

Australian patent application AU 9513195 describes a process for incorporating talc in a thermoplastic. This process involves numerous stages and in particular the preparation of granules obtained by compressing a talc/water/polyethylene glycol or polypropylene glycol mixture before incorporating the said granules in the thermoplastic. This process is only used to facilitate the handling of the talc powder and produces, as regards the final material, a result identical or indeed inferior to that obtained by direct dispersion of the starting powder in the molten polymer. According to this process, the granules are preferably dried so as to remove the water therefrom until a residual moisture percentage by weight of less than 0.5% of water with respect to the weight of dry talc is reached. This process requires the use of polyethylene glycol or polypropylene glycol. Due to the proportions indicated of talc and of water, the talc is never in the suspended state at any time in the process described in this document.

2. SUMMARY OF THE INVENTION

Accordingly, it is the first object of the present invention to provide a process for the preparation of a material comprising a filler of solid particles dispersed in a polymer by extrusion of a composition prepared by mixing an aqueous suspension or dry mixing of said filler with particles or granules of said polymer.

It is the second object of the present invention to provide a polymerization material comprising at least one propylene polymer and at least one filler of solid particles, wherein said filler of solid particles dispersed in said polymer by extrusion of a composition prepared by mixing an aqueous suspension of said filler with particles or granules of said polymer.

It is the third object of the present invention to provide an article obtained by conversion of a polymerization material comprising a filler of solid particles dispersed in a polymer by extrusion of a composition prepared by mixing an aqueous suspension of said filler with particles or granules of said polymer.

There are other objects of the present invention as well as the advantages thereof can be understood by referring to the following disclosure and claims.

The foregoing objects are coherent according to the present invention which relates to a process for the preparation of a composition to be extruded comprising a polymer and a filler of solid particles comprising a stage of mixing the filler of solid particles with particles or granules of the said polymer, if appropriate in the form of an aqueous suspension.

The invention is particularly simple, and the final material is in better mechanical properties than those obtained by direct incorporation of the solid filler in the polymer or copolymer. This improvement is very substantial, in particular with regard to the impact strength of the final material. The invention also relates to a polypropylene-based composition comprising a filler of solid particles, such as kaolin, exhibiting a high flexural modulus and a good impact strength.

3. DESCRIPTION OF THE PREFERRED EMBODIMENTS

According to the invention, in a first aspect, an aqueous suspension of the filler of solid particles is employed, without it being necessary to remove the water or to reduce the residual moisture percentage by weight to less than 0.5% of water with respect to the weight of inorganic filler and without it being necessary to prepare granules by pressing. This process is thus particularly simple and furthermore leads, as regards the final material, to better mechanical properties than those obtained by direct incorporation of the solid filler in the polymer in the molten state. This improvement is very substantial, in particular as regards the impact strength of the final material. These better properties are obtained even in the absence of use of polyethylene glycol or of polypropylene glycol.

The improvement introduced by the invention arises from a reduction of agglomerates of solid filler and thus from a better dispersion of the said filler in the final material. This is because it has been discovered, in the context of the present invention, that the good state of dispersion of a solid filler in an aqueous suspension could be used to bring about a good state of dispersion of the same solid filler in a polymer.

The invention relates, in a first aspect, to a process for the preparation of a composition to be extruded comprising a polymer and a filler of solid particles comprising a stage of mixing an aqueous suspension of the filler of solid particles with particles or granules of the said polymer. This process is subsequently known as "suspension process".

Suspension is understood to mean that the space between the particles of solid filler is entirely occupied by a liquid, preferably an aqueous liquid.

The suspension is preferably homogeneous during its employment in the context of this process. The suspension is preferably stable.

The composition to be extruded can be prepared in very different ways, the essence being, for this suspension process, that the filler of solid particles passes through the suspension state and that it is this suspension which is brought into contact with the granules or particles of the polymer.

For example, the mixing stage leading to the composition to be extruded can be carried out continuously at the extruder head before entry into the region for melting the polymer. Thus, the mixing can be carried out at the extruder head from an individual delivery of a suspension of the filler of solid particles, and an individual delivery of granules or particles of the polymer, or an individual delivery of a suspension of the filler of solid particles, and an individual delivery of a latex of the polymer or copolymer.

The mixing stage can also be carried out beforehand, in an operation independent of the extrusion, by itself. This mixing can then also be carried out in a highly varied way, continuously or under batchwise conditions.

By way of alternative form, the polymer can be in the form of a latex for being brought into contact with the suspension.

The ingredients participating in the mixing are generally in an amount such that the mixing results in a preparation comprising:

3 to 30% by weight of water, 4 to 60% by weight of filler of solid particles, to 90% by weight of polymer.

This preparation can constitute the composition to be introduced into the extruder. However, the at least partial removal of the water, for example by drying before introduction into the extruder, is not excluded. As has already been said, a drying stage is not essential in the context of the present invention and, in any case, drying should not be carried out if it results in agglomeration.

In the context of the suspension process, it is essential for the filler of solid particles to pass through a suspension state. In the suspension, the amounts of water and of filler of solid particles should be adjusted according to the nature and more particularly the relative density and the particle size of the latter, in order for the suspension state to be actually produced.

In particular, if the filler in the suspension is talc, it is generally advisable for the ratio by mass of water to talc to be greater than 0.55, in order for it to be possible to obtain the suspension state.

If the filler in the suspension is calcium carbonate, it is generally advisable for the ratio by mass of water to calcium carbonate to be greater than 0.25, in order for it to be possible to obtain the suspension state.

If the filler in the suspension is kaolin, it is generally advisable for the ratio by mass of water to kaolin to be greater than 0.25, in order for it to be possible to obtain the suspension state.

Generally, in the suspension, the ratio by mass of water to the filler of solid particles ranges from 0.2 to 0.65.

The filler of solid particles is provided, in the dry state, in the form of a powder. This powder can exhibit a mean particle size diameter ranging from 0.01 to 50 $\mu$m.

The suspension process provides comfort as regards the handling of the filler of solid particles, in particular if the filler is very fine, that is to say exhibits a mean particle size diameter of less than 1 $\mu$m and even 5 $\mu$m. This is because such powders are very difficult to transport because of their low bulk density and their tendency to agglomerate, for example on the walls of the equipment provided for their metering or their transportation. These problems are thus overcome by making the filler of solid particles pass through a suspension state. For this reason also, the metering of the filler of solid particles for its transportation is greatly facilitated and its delivery is more even.

The solid filler cannot be melted and is stable under the conditions of use according to the invention. This means that the temperature used, in particular as regards the extruder, is sufficient to cause the polymer to melt but insufficient to cause the solid filler to melt.

The filler of solid particles can be organic or inorganic.

Mention may be made, as example of filler, of: talc, kaolin, mica, wollastonite, calcium carbonate, carbon black, graphite, silica, aluminum trihydrate, titanium dioxide, barium sulphate, magnesium hydroxide, magnesia, alumina, zirconia, natural or synthetic, organic or inorganic fibers, hollow or full glass beads, slate, marble or organic or inorganic pigments.

For carrying out the mixing in the context of the suspension process, the polymer can be provided in the form of granules or, preferably, in the form of particles, that is to say in the form of a powder.

This powder is preferably devoid of sharp angles and is thus preferably prepared by a process not involving milling at the end of preparation, for example a cryogenic milling. This powder can, for example, be spherical or nearly spherical and be porous or non-porous.

For carrying out the mixing in the context of the suspension process, the polymer can be used in the form of a powder in aqueous suspension, commonly known as "latex".

When it is in the powder form, the polymer preferably exhibits a mean particle size diameter ranging from 1 to 2000 $\mu$m.

The present invention can be used each time the aim is to improve the dispersion of a filler of solid particles in a polymer.

In the context of the present application, the term polymer covers those of homopolymer, copolymer, interpolymer and mixtures of polymers.

The polymer can be chosen from thermo-plastics, for example polyolefins, such as polypropylene, polyethylene or polybutylene. These polyolefins can be homopolymers or block or random copolymers. They can also be modified, for example by grafting or copolymerization, in order to contain functional or non-functional monomers. Such a functional monomer can, for example, be an acid, an anhydride, an imide, an amide, an alcohol, an acetate or an acrylate.

The polymer can be chosen from mixtures of polyolefins or compositions comprising at least one polyolefin and another thermoplastic or elastomer.

The polymer can be chosen from chlorinated polymers, for example poly(vinyl chloride) (PVC), acrylic or methacrylic polymers, for example poly(methyl methacrylate), vinylaromatic polymers, for example polystyrene, fluorinated polymers, for example poly (vinylidene fluoride), polyacetals, for example polyoxymethylene, polyamides, polyimides, polyketones, polyesters, for example poly (butylene terephthalate), or polycarbonates.

The polymer generally exhibits a melt index at 190° C. under 2.16 kg (ISO Standard 1133:91) ranging from 0.01 to 200 g/10 min and preferably, at 230° C. under 2.16 kg, ranging from 0.1 to 60 g/10 min.

The suspension used for the preparation of the composition can be commercially available. The suspension generally exhibits a Brookfield viscosity at 23° C. and at 100 revolutions per min of less than 10,000 mPa·s and preferably of less than 3000 mPa·s. Such a suspension generally comprises at least one dispersing agent, such as, for example, a polyacrylate, so that it is homogeneous and stable. It can comprise at least one other additive, such as, for example, at least one antiseptic agent.

The invention also relates, in a second aspect, to a process for the preparation of a material comprising a filler of solid particles which are dispersed in a polymer by extrusion of a composition prepared by mixing the said filler with particles of the said polymer. This process is hereinafter referred to as "dry-route process". In this process, the particles of filler and the particles of polymer are dry mixed, that is to say that it is not necessary to add a liquid. Of course, it is not ruled out that the particles of filler and/or of polymer contain water in the adsorbed form, as is the case with all solids brought into contact with the surrounding air. This therefore means that the composition intended to feed the extruder preferably does not contain a liquid forming phase independent of the solid particles. Thus, this process should be clearly distinguished from that which consists of mixing the particles in a liquid, drying in order to remove the liquid, and then passing the resulting solid into the extruder. This is because the drying process results in the formation of a cake and in an agglomeration of the particles, which is harmful to the quality of the dispersion in the final material and thus to the mechanical properties of the latter.

In this process, the polymer and the particles of filler are dry mixed and the mixture thus obtained is introduced as is into the extruder.

In the context of this "dry-route" process, the solid fillers and the polymers envisaged above in the context of the "suspension" process can be used.

In the "dry-route" process, the polymer is preferably in the form of particles with a mean diameter ranging from 50 µm to 1.3 mm. In this process, it is not ruled out that at least one constituent which has to take part in the composition of the final material should be provided in the form of granules, such as, for example, granules of colorant master mix. However, it is preferable for the composition intended to be extruded in the context of the dry-route process to be composed, for more than 50% and even for more than 90% of its mass, of particles with a mean diameter of less than 1 mm.

In the context of the "suspension" and "dry route" processes, the material obtained after extrusion can comprise at least one additive conventional to plastics, such as at least one stabilizing agent, one flame-retardant agent or one antioxidant. Some of these additives are, for example, mentioned in Additives for Plastics Handbook, John Murphy, Elsevier Advanced Technology, ISBN 1856 172813, 1996. For the purpose of its incorporation in the final material, this additive can be brought into contact with the polymer before extrusion in various ways. For example, in the context of the suspension process, it can be introduced into the suspension of the filler of solid particles or be already present in the polymer powder or granules.

The additive can also be added in the downstream part of the extruder, that is to say, after the various ingredients have been brought into contact.

The suspension and dry-route processes both make use of the extrusion of a composition. Depending on the physical state of the composition, the suitable transportation means for bringing it to the extruder is used. If the composition is rich in liquid, as for a suspension, the mixture can be transported and metered, like a liquid, by a pump. If the composition is rich in solid, it can be transported and metered by a screw feeder or a belt feeder.

In the extruder, the composition is brought to a temperature sufficient to melt the polymer. It is preferable to use an extruder with a definite melting region, such as a twin-screw corotating extruder or an extruder of the cokneader type equipped with a suitable screw profile, rather than an extruder with a gradual melting region, such as a single-screw extruder.

In the context of the suspension process, the water initially present in the composition is removed under the effect of the heat, partly at the extruder inlet and the remainder at the degassing vent or vents situated along the extruder.

In the context of the preparation of the material by the suspension or dry routes, the filler of solid particles and the extrusion temperature are to be chosen so that the said filler does not melt during extrusion.

Generally, when the subject of interest is a polymer filled with solid particles, the target is a ratio by mass of the filler to the polymer ranging from 0.05 to 17. Thus, the various ingredients employed in the context of the suspension and dry-route processes can be introduced so that the final material exhibits such a filler/polymer ratio. Such a ratio can be observed in the context of the suspension process from the stage of mixing the suspension with the polymer.

The extrusion results in a material which it is possible, for example, to granulate. The polymer can be a propylene polymer.

The suspension or dry-route processes are particularly suited to the incorporation of a particulate solid filler in polypropylene or a propylene-ethylene block copolymer. Such a copolymer can comprise from 4 to 16% by weight of ethylene and can be functionalized by grafting, for example with maleic anhydride.

The invention also relates, in a third aspect, to a material comprising a propylene polymer and a filler of solid particles, hereinafter known as "polypropylene-based material".

Solid fillers can be incorporated in polypropylenes in particular in order to increase their flexural moduli. However, the introduction of solid fillers into polypropylenes generally has a tendency to embrittle them (lower impact strength) because the particles of solid filler tend to initiate cracks under the effect of impacts. In order to compensate for this undesirable effect, it is possible to incorporate polymerized ethylene units in the material based on propylene polymer, for example in the form of units copolymerized with propylene within the polypropylene itself or in the form of an addition of a polymer other than the polypropylene forming the base of the material. Thus, according to this second alternative form, a copolymer of ethylene and of propylene, usually called "ethylene-propylene rubber" and commonly denoted by "EPR", for example, can be added to the composition comprising the polypropylene. Such a copolymer can, for example, comprise 50% by weight of polymerized units resulting from ethylene and 50% by weight of polymerized units resulting from propylene. The incorporation of polymerized ethylene units in a polypropylene-based material generally results, however, in a fall in its flexural modulus, an increase in its viscosity, which makes it more difficult to inject, a decrease in its resistance to solvents, such as alcohols or hydrocarbons, a decrease in its resistance to scratching and a decrease in its deformation temperature under load. For this reason, it may also be desired to minimize the content of polymerized ethylene units within polypropylene-based materials comprising a filler of solid particles, as soon as the properties which have just been mentioned assume importance.

It is thus difficult to reinforce a polypropylene with a filler of solid particles so as to increase its flexural modulus, without losing much of its impact strength, and while incorporating the least possible amount of polymerized ethylene units therein and while retaining good resistance to scratching.

The polypropylene-based material according to the invention introduces a solution to the above-mentioned problems.

This material comprises at least one propylene polymer and at least one filler of solid particles, the said propylene polymer exhibiting a ratio of the total penetration energy to the maximum load energy ("énergie à la force de pointe" in french) of at least 1.8, as measured according to ISO Standard 6603–2:1989 (F), the solid filler being in an amount sufficient for the ratio of the flexural modulus of the material to that of the propylene polymer to be greater than 1.7, the said flexural moduli being measured according to ISO Standard 178:93, the filler solid particles being sufficiently dispersed within the material for the total penetration energy of the material to represent at least 80% of the total energy of the propylene polymer, the said total energy being determined by measuring the strength under multiaxial impact according to ISO Standard 6603–2:1989 (:F), the said material being such that at least 60% of its mass is composed of polymerized propylene units.

The preparation of the material according to the invention can be so optimized that it exhibits a flexural modulus according to ISO Standard 178:93 of greater than 1800 MPa and a resistance to multiaxial impact, measured according to ISO Standard 6603–2:1989 (F), of at least 60 joules.

The polypropylene-based material according to the invention can comprise from 17 to 25% by weight of filler of solid particles. The filler must be sufficiently dispersed within the material, which can be obtained using the "suspension" and "dry-route" processes described above, the suspension process generally giving superior results, in particular with respect to the impact strength.

For the polypropylene based material according to the invention, the filler of solid particles preferably exhibits a mean diameter of less than 2 μm.

More preferably, the filler of solid particles exhibits a mean diameter of less than 0.8 μm.

The filler of solid particles is preferably such that the fraction by mass of particles with a size of less than 2 μm is at least 95%. The filler of solid particles is preferably kaolin.

The polypropylene-based material according to the invention can comprise at least one colorant. The polypropylene-based material according to the invention can comprise at least one organic or inorganic pigment generally in the form of particles, which pigment can be incorporated in the said material from a master mix. The master mix can comprise a polymer of at least one olefin, such as ethylene or propylene. Mention may be made, as example of ethylene polymer, of low-density polyethylene. The master mix can comprise, for example, from 30 to 60% by weight of polymer of at least one olefin and 40 to 70% by weight of pigments. Mention may be made, as example of pigments, of: titanium dioxide, carbon black, chromium titanate, red iron oxide or phthalocyanine green or blue.

The polypropylene-based material according to the invention may also not comprise pigment; it may also not comprise homopolyethylene; it may also not comprise fibers; it may comprise less than 10%, indeed less than 8%, by weight of polymerized ethylene.

The materials obtained by the "suspension" and "dry-route" processes and the polypropylene-based material according to the invention are obtained after an extrusion which can be followed by a granulation. These materials, if appropriate in the form of granules, can be-converted into articles by the usual techniques for the conversion of plastics, such as injection. They are more particularly intended for the production of articles exhibiting a volume of greater than 1 cm$^3$ and/or for the production of articles exhibiting a minimum thickness in all directions of at least 1 mm, indeed of at least 2 mm, indeed of at least 3 mm. These materials, in particular those containing a propylene polymer, are particularly suited for the production of components in the passenger compartment of motor vehicles, such as fascias of motor vehicles.

In the following examples, the following ingredients are used:

Calcium carbonate in the powder form: The particle size distribution of the calcium carbonate used is characterized by a mean diameter of 0.7 μm and by a fraction by weight of particles of less than 1 μm of 82% (particle size curve obtained on a device of Sedigraph 5100 type). The calcium carbonate is substantially rhombohedral in shape.

Suspension of calcium carbonate in water: This suspension uses the above-mentioned calcium carbonate and is characterized by a solids content of 76%. Its Brookfield viscosity at 23° C. and at 100 rev/min is less than 400 mPa·s. This suspension is sold under the trade name Setacarb SO-0G by the company Omya.

Kaolin K1 in the powder form: The particle size distribution of this kaolin, known as "kaolin K1", is characterized by a mean diameter of between 0.3 and 0.5 μm and by a fraction by weight of particles of less than 2 μm of 97% (particle size curve obtained on a device of Sedigraph 5100 type). This kaolin K1 is of substantially polygonal lamellar shape.

Suspension S1 of kaolin K1 in water: This suspension uses the above-mentioned kaolin K1 and is characterized by a solids content of 74%. Its Brookfield viscosity at 23° C. and at 100 rev/min is 230 mPa·s. This suspension is sold under the trade name Amazon 88 by the company Kaolins d'Arvor.

Suspension S2 of kaolin K2 in water: This suspension uses a kaolin, known as kaolin K2, the particle size distribution of which is characterized by a mean diameter of between 0.5 and 1 μm and by a fraction by mass of particles with a size of less than 5 μm of 92%. Its solids content is 67%. Its Brookfield viscosity at 23° C. and at 100 rev/min is 300 mPa·s. This suspension is sold under the trade name Helite MS by the company Kaolins d'Arvor.

Talc in the powder form: The particle size distribution of the talc used is characterized by a mean diameter of 1.8 μm and by a fraction by weight of particles of less than 5 μm of 90% (particle size curve obtained on a device of Sedigraph 5100 type). The talc is substantially lamellar in shape.

Suspension of talc in water: This suspension uses the above-mentioned talc and is characterized by a solids content of 60%. Its Brookfield viscosity at 23° C. and at 100 revolutions per minute is less than 1200 mPa·s. This suspension contains a dispersant of polyacrylate type in the proportion of approximately 0.5% by weight.

Colorant master mix: Granules of a composition comprising 47% by weight of low-density polyethylene and 53% by weight of pigments, the latter being a mixture of titanium dioxide, carbon black, chromium titanate, red iron oxide and phthalocyanine green.

PP1: Propylene-ethylene block copolymer containing approximately 7.7% by weight of ethylene. This copolymer is used in the powder form as results from a polymerization reactor. Its grains have a substantially spherical shape and their diameter ranges from 0.3 to 1.3 mm. This copolymer exhibits a flow index at 230° C. under 2.16 kg of between 9 and 11 g/10 min (ISO Standard 1133:91), following an extrusion through a twin-screw corotating extruder, during which the following stabilization additives are also added: 1000 ppm of a 50/50 by weight mixture of tris(2,4-di-tert-butylphenyl) phosphite (Irgafos 168 from the company Ciba-Geigy) and of tetrakis [3-(3',5'-di-tert-butylphenyl) propionate]methane (Irganox 1010 from the company Ciba-Geigy) and 500 ppm of hydrotalcite (DHT4A from the company Mitsui). PP1 thus denotes the copolymer without the stabilization additives, but the latter are mixed with PP1 during the implementation of the processes described above. This copolymer, tested in multiaxial impact strength according to ISO Standard 6603–2:1989 (F), exhibits a ratio of the total penetration energy to the maximum load energy ("energie la force de pointe" in french) of 1.95.

PP2: Propylene-ethylene block copolymer containing approximately 9.5% by weight of ethylene. This copolymer is used in the powder form as results from a polymerization reactor. Its grains have a substantially spherical shape and their diameter varies from 0.3 to 1.3 mm. This polymer is characterized by a flow index at 230° C. under 5 kg of between 8 and 12 g/10 min (ISO Standard 1133:91), following an extrusion through a twin-screw corotating extruder, during which the same stabilization additives as those described in the case of PP1 are also added in the same proportions. PP2 thus denotes the copolymer without the stabilization additives but the latter are mixed with PP2 during the implementation of the processes described hereinbelow.

PP3: Substantially cylindrical granules having a diameter of between 3 and 4 mm and a length of between 3 and 5 mm, with a composition obtained by extrusion of PP1 during which the same amounts of stabilization additives used in the context of the characterization of PP1 were added. PP3 thus denotes granules with a composition comprising a copolymer and stabilization additives.

In the following examples, the following processes are compared:

Process P0 (comparative):
No solid filler is used. The copolymer and, if appropriate, the colorant master mix are introduced at the extruder inlet.

Process P1 (comparative):
The copolymer, the stabilization additives and, if appropriate, the colorant master mix are introduced at the extruder inlet and then the solid filler in the powder form is introduced in the molten region, that is to say at a degassing vent, using a feeder.

Process P2 (according to the invention):
The copolymer and the stabilization additives, on the one hand, and the filler in the suspension form, on the other hand, are introduced individually at the extruder inlet.

Process P3 (according to the invention):
A premix of the copolymer and of the suspension is prepared in the proportions of 80% by weight for the copolymer and its additives and 20% by weight for the suspension and this premix is introduced at the extruder inlet.

Process P4 (comparative):
The copolymer and the stabilization additives are introduced at the extruder inlet and the suspension is introduced in the molten region of the extruder, that is to say at one of its degassing vents.

Process P5 (dry route):
The copolymer, the stabilization additives, if appropriate the colorant master mix and the solid filler in the powder form are premixed in a fast mixer which can be, for example, a drum with a vertical axis rotating about a horizontal axis or a stationary drum within which four paddles are rotating (mixer of Henschel trademark). The mixture thus obtained is introduced at the extruder inlet.

In the following examples, the following characterization techniques were used:

MI2 : melt index at 230° C. under 2.16 kg (ISO Standard 1133:91),

MI5 : melt index at 230° C. under 5 kg (ISO Standard 1133:91),

Level of filler in the final composition: by measuring the level of ash at 600° C. In the specific case of kaolin, the water of crystallization contained in the filler (approximately 14% by weight) is taken into account in relating level of ash and level of fillers. This correction is not necessary in the case of calcium carbonate and in the case of talc, The resistance to scratching is measured on an injected plate after rubbing with an abrasive paper. The variation in luminance due to the abrasion is measured by spectrocolorimetry in the visible region. A high variation in luminance reflects a low resistance to scratching, Mechanical properties:
The compositions obtained are injection moulded at temperatures of 210 to 240° C. in the form of bars or plates. The bars have the following dimensions: 80×10×4 mm and make it possible to carry out the Flexural Modulus test (ISO Standard 178:93) and the Notched Charpy Impact test (ISO Standard 179:93 1EA) or Unnotched Charpy Impact test (ISO Standard 179:93 1EU). The plates have the following dimensions: 100×100×3 mm and make it possible to carry out multiaxial impact tests at a speed of 4.3 m/s (ISO Standard 6603-2:89). In the latter test, the total energy absorbed by the material during impact is measured and the course of the force-deformation curve is evaluated. The course of this curve makes it possible, in a way known to persons skilled in the art, to determine the type of failure of the sample: ductile or brittle. In the tables, 100% D means that 100% of the plates have been broken in a ductile way. All the mechanical tests are carried out at 23° C. The bars and the plates are conditioned at ambient temperature for a minimum of 5 days before being tested.

In the tables, 100% B means that 100% of the bars have been completely broken and 100% P means that 100% of the bars have been partially broken.

3.1. Examples 1 to 5

A twin-screw corotating extruder with a screw diameter of 30 mm (Werner ZSK30) with a total throughput of kg/h is used. This throughput represents the sum of the deliveries of the ingredients used. The set temperatures of the barrels are those commonly used for a polypropylene, that is to say 210 to 240° C. However, the temperature of the region situated immediately after the inlet of the extruder is from 265 to 280° C., in order to promote the rapid melting of the copolymer powder. The rods resulting from the machine are cooled by a water trough and are converted into granules. If appropriate, the proportion of suspension introduced into the extruder is calculated in order finally, that is to say after removing the water, to result in the desired level of fillers.

The copolymer used is PP1 and the filler used is kaolin, in the suspension form S1 or powder form K1, according to the process used.

The results are collated in Table 1.

3.2. Examples 6 to 8

The preparation is carried out as for Examples 1 to 5, except that the copolymer PP2 is used in place of the copolymer PP1, that the calcium carbonate filler is used in place of the kaolin filler and except that a twin-screw corotating extruder with a screw diameter of 40 mm (Werner ZSK 40) with a total throughput of 20 kg/h is used.

The results are collated in Table 2.

3.3. Examples 9 and 10

The preparation is carried out as for Examples 6 to 8, except that the copolymer PP1 is used and that the filler is talc. The results are collated in Table 3.

3.4. Examples 11 AND 12

A twin-screw corotating extruder with a screw diameter of 40 mm (Werner ZSK40) with a total throughput of 40 kg/h is used. This throughput represents the sum of the deliveries of the ingredients used. The set temperatures of the barrels are those commonly used for a polypropylene, that is to say 210 to 240° C. However, the temperature of the region situated immediately after the inlet of the extruder is from 260 to 280° C., in order to promote the rapid melting of the copolymer powder. The rods resulting from the machine are cooled in a water trough and are converted into granules. The proportion of suspension introduced into the extruder is calculated in order finally, that is to say after removing the water, to result in the desired level of filler.

The copolymer used is PP1 and the filler used is kaolin. The suspension S2 was used for Example 11 and the suspension SI was used for Example 12. The results are collated in Table 4.

3.5. Examples 13 to 16

A twin-screw corotating extruder with a screw diameter of 40 mm (Werner ZSK40) with a total throughput of 40 kg/h

TABLE 1

| | | EXAMPLE NO. | | | | |
| --- | --- | --- | --- | --- | --- | --- |
| | | 1 | 2 | 3 | 4 | 5 |
| | Process | P0 (comparative) | P1 (comparative) | P2 | P3 | P4 (comparative) |
| Level of fillers | % by weight | 0.0 | 17.5 | 13.5 | 15.0 | 13.5 |
| M12 | g/10 min | 11.0 | 12.5 | 5.0 | 5.0 | 12.5 |
| Flexural modulus | MPa | 1030 | 1450 | 1410 | 1485 | 1275 |
| Notched Charpy Impact | $KJ/m^2$ | 7.0 (100% B) | 4.5 (100% B) | 8.0 (100% B) | 8.5 (100% B) | 4.0 (100% B) |
| Total energy/ Multiaxial impact | Joules | 77 | 20 | 70 | 71 | 8 |

TABLE 2

| | | EXAMPLE NO. | | |
| --- | --- | --- | --- | --- |
| | | 6 | 7 | 8 |
| | Process | P0 (comparative) | P1 (comparative) | P2 |
| Level of fillers | % by weight | 0.0 | 25.0 | 22.5 |
| MI5 | g/10 min | 10.5 | 3.5 | 4.5 |
| Flexural modulus | MPa | 990 | 1430 | 1379 |
| Notched Charpy Impact | $KJ/m^2$ | 14.0 | 10.5 (100% B) | 50.0 (100% P) |
| Total energy/ Multiaxial impact | Joules | 80 | 35 | 73 |

TABLE 3

| | | EXAMPLE NO. | |
| --- | --- | --- | --- |
| | | 9 | 10 |
| | Process | P2 (comparative) | P1 (comparative) |
| Level of fillers | % by weight | 11.5 | 14.0 |
| MI5 | g/10 min | 9.5 | 14.0 |
| Flexural modulus | MPa | 1920 | 1840 |
| Notched Charpy Impact | $KJ/m^2$ | 7.0 (100% B) | 4.0 (100% B) |
| Total energy/ Multiaxial impact | Joules | 59 | 38 | is used. This throughput represents the sum of the deliveries of the ingredients used. The set temperatures of the barrels are those commonly used for a polypropylene, that is to say 210 to 240° C. However, the temperature of the region situated immediately after the inlet of the extruder is from 260 to 280° C., in order to promote the rapid melting of the copolymer powder. The rods resulting from the extruder are cooled in a water trough and are converted into granules. The results are collated in Table 5.

The copolymer used in Examples 13 to 15 is PP1. The copolymer used in Example 16 is PP3. The inorganic filler used is the kaolin K1 in the powder form.

TABLE 4

|  |  | EXAMPLE NO. | |
|---|---|---|---|
|  |  | 11 | 12 |
|  | Process | P2 | P2 |
| Level of fillers | % by weight | 21 | 24 |
| Flexural modulus | MPa | 2180 | 1930 |
| Total energy/ Multiaxial impact | Joules | 47 | 72 |
| Type of failure |  | 10% D | 100% D |

TABLE 5

|  |  | EXAMPLE NO. | | | |
|---|---|---|---|---|---|
|  |  | 13 | 14 | 15 | 16 |
|  | Process | P0 (comparative) | P5 | P5 | P1 (comparative) |
| Level of fillers | % by weight | 0 | 21 | 20 | 21 |
| Colorant master mix | % by weight | 6 | 6 | 3 | 6 |
| MI2 | g/10 min | 9 | 5.4 |  | 4.3 |
| Flexural modulus | MPa | 1050 | 1840 |  | 1700 |
| Total energy/ Multiaxial impact | Joules | 73 | 68 |  | 26 |
| Ductility |  | 100% D | 100% D |  | 0% D |
| Resistance to scratching |  | <1 | 1.7 | 1.7 | 1.65 |

What is claimed is:

1. A process for the preparation of a material comprising a filler of solid particles which is dispersed in a polymer by extrusion of a composition prepared by mixing an aqueous suspension of said filler with particles or granules of said polymer at a temperature below melting point of the polymer.

2. The process according to claim 1, characterized in that the mixing is carried out before entry into the region for melting the polymer in the extruder and in that the extrusion is carried out at a temperature sufficient to melt the polymer and insufficient to cause the filler of solid particles to melt, the water initially present in the composition being removed under the effect of the heat partly at the extruder inlet and the remainder at the degassing vent or vents situated along the extruder.

3. The process according to claim 1, characterized in that the mixing results in a preparation comprising:

3 to 30% by weight of water, 4 to 60% by weight of filler of solid particles, 20 to 90% by weight of polymer.

4. The process according to claim 1, characterized in that, in the suspension, the ratio by mass of water to the filler ranges from 0.2 to 0.65.

5. The process according to claim 1, characterized in that the suspension exhibits a Brookfield viscosity at 23° C. and at 100 revolutions per minute of less than 10,000 mPa·s.

6. A process for the preparation of a material comprising from 17 to 25% by weight of a filler of solid particles which is dispersed in at least one propylene polymer, by extrusion of a composition prepared by dry mixing said filler with particles of said polymer.

7. The process according to claim 6, characterized in that the composition is composed, for more than 50% of its mass, of particles with a mean diameter of less than 1 mm.

8. The process according to claim 6, characterized in that the polymer is in the form of particles with a mean diameter ranging from 1 to 2000 $\mu$m.

9. The process according to claim 6, characterized in that the ratio by mass of the filler to the polymer ranges from 0.05 to 17.

10. The process according to claim 6, characterized in that the filler of solid particles exhibits a mean particle size diameter ranging from 0.01 to 50 $\mu$m.

11. The process according to claim 6, characterized in that the mean particle size diameter of the filler is less than 5 $\mu$m.

12. The process according to claim 6, characterized in that the filler of solid particles is chosen from kaolin, calcium carbonate or talc.

13. The process according to claim 12, characterized in that the filler is made of kaolin.

14. The process according to claim 12, characterized in that the polymer is a propylene polymer.

15. The process of claim 1 wherein the filler of solid particles exhibits a mean particle size diameter raging from 0.01 to 50 $\mu$m in dry state.

16. The process of claim 15 wherein the mean particle size diameter is less than 5 $\mu$m in dry state.

* * * * *